A. J. MARTIN.
WINDOW AND VERANDA BOX.
APPLICATION FILED MAR. 2, 1915.
1,139,883.
Patented May 18, 1915.
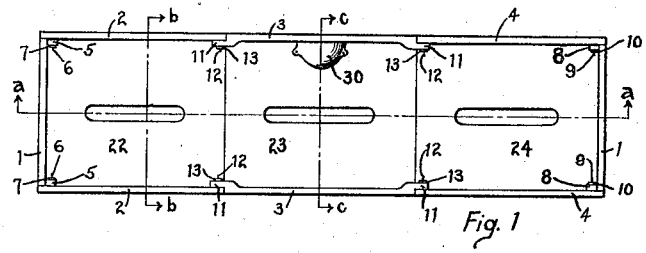
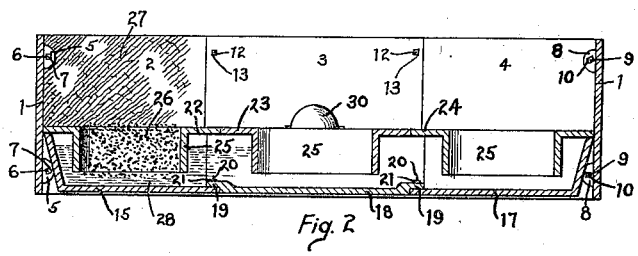
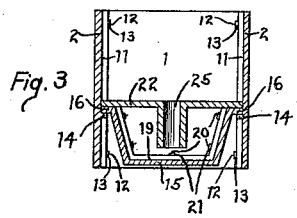
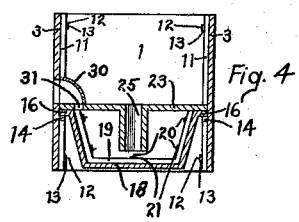
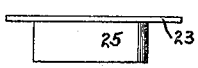
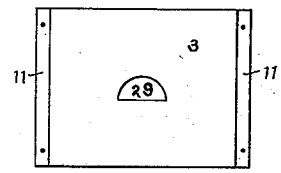
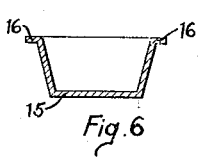
Witnesses
Elwood H. Herbig
C. G. Paull
Inventor
Albert J. Martin,
By Howard P. Smith,
His Attorney
THE NORRIS PETERS CO., PHOTO-LITHO., WASHINGTON, D. C.

UNITED STATES PATENT OFFICE.

ALBERT J. MARTIN, OF DAYTON, OHIO.

WINDOW AND VERANDA BOX.

1,139,883.   Specification of Letters Patent.   Patented May 18, 1915.

Application filed March 2, 1915. Serial No. 11,601.

*To all whom it may concern:*

Be it known that I, ALBERT J. MARTIN, a citizen of the United States, residing at Dayton, in the county of Montgomery and State of Ohio, have invented new and useful Improvements in Window and Veranda Boxes, of which the following is a specification.

This invention relates to new and useful improvements in window and veranda boxes. The object of my invention is to provide for plants and flowers, a window and veranda box which may be easily and readily enlarged or contracted to fit the space it is to occupy, and which will automatically and properly supply with water the plants and flowers it contains.

The preferred form of embodiment of my invention is illustrated in the accompanying drawings, of which—

Figure 1 is a top plan view of my improved window and veranda box. Fig. 2 is a sectional view, in elevation, taken on the line $a$—$a$ of Fig. 1, showing the reservoir and the method of joining the sections thereof. Fig. 3 is a sectional view taken on the line $b$—$b$ of Fig. 1. Fig. 4 is a sectional view taken on the line $c$—$c$ of Fig. 1. Fig. 5 is a detail side view of one of the flattened tubes for supplying water to the plants. Fig. 6 is a sectional view through the reservoir. And Fig. 7 is a side view of one of the box sections, showing the opening through which the water is poured into the reservoir.

Throughout the specification and drawings, similar reference characters denote corresponding parts.

In a detailed description of the preferred form of embodiment of my invention, the numerals 1 1 designate the end walls, and 2 2, 3 3 and 4 4 the side walls of a box which is preferably constructed of metal and open at the bottom and the top. The end wall 1 is firmly, but removably, secured to the side walls 2 2 in the following manner. Suitably secured near each corner of the end wall 1, and projecting inwardly therefrom in planes parallel to the side walls 2 2, are semi-circular plates 5 adapted to receive, through apertures therein, bolts 6. These bolts also pass through the side walls 2 2, to which, after said bolts pass through the plates 5, the latter are firmly clamped by nuts 7. By means of semi-circular plates 8, bolts 9 and nuts 10 exactly similar to the plates 5, bolts 6 and nuts 7 respectively, the opposite end wall 1 is similarly clamped to the side walls 4 4.

The side walls 3 3 are firmly, but removably, secured to the side walls 2 2 and 4 4 in the following manner. Those sides of the walls 3 which are to abut against the side walls 2 2 and 4 4, are formed to provide L-shaped tongues 11. These tongues are designed to overlap or extend a short distance over the inner faces of the walls 2 2 and 4 4, to which they are firmly joined by means of bolts 12 and nuts 13. It will thus be seen that the side walls 3 3 may be readily secured to the side walls 2 2 and 4 4 to form, with the end walls 1 1, a plant or flower frame, and that by having on hand, side walls 3 3 of varying lengths, this frame may be lengthened or contracted to fit almost any space on a porch or veranda.

Formed a short distance below the middle portions of the side walls 2 2, 3 3 and 4 4 in horizontal alinement with each other, are longitudinal strips or shoulders 14. There is one of these sectional strips 14 on each side of the frame an equal distance from the bottom, to receive or support therein a sectional reservoir constructed as follows:

Referring to Figs. 2, 3 and 6, the numeral 15 designates a trough-shaped section preferably constructed of cast iron and open at one end. The upper side walls of this section are turned outwardly to form projections 16 designed to rest upon the shoulders or ledges 14 and thereby support said section within the frame above described. The numeral 17 designates a similar trough-shaped section adapted to rest upon the shoulders or ledges 14 in the opposite end of the frame. The middle portion of the reservoir consists of a trough-shaped section 18 open at both ends, the latter being turned to form L-shaped tongues 19 adapted to overlap or extend a short distance over the adjacent inside faces of the end sections 15 and 17. By means of bolts 20 adapted to pass through these L-shaped tongues 19 and the corresponding edges of the sections 15 and 17, all three sections 15, 17 and 18 may be firmly secured together to form a complete water-containing reservoir after nuts 21 are tightly screwed upon said bolts. This reservoir being constructed in readily united sections, its length can easily be made to conform to that of the before-described plant frame by the use of a middle section 18 of the size desired. When supported upon the ledges 14 within said frame, the bottom of the reservoir will be a slight distance above the surface upon which the said frame rests.

Adapted to rest upon the tops of the reservoir sections 15, 17 and 18 are covers 22, 23 and 24 respectively, which conform in shape to the top outlines of their respective reservoir sections. Projecting downwardly from the upper face of each of these covers, is an elongated flattened tube 25 which is constructed to extend below the level of the water in the reservoir. These tubes are filled with moss 26 or other porous material, while the space above the covers is filled with earth 27 to grow plants and flowers. The moss 26 acts as a wick to conduct, by capillary attraction, water 28 from the reservoir to the earth 27, thereby automatically and properly watering the said earth as long as there is any liquid in the reservoir above the lower ends of the tubes 25. (See Figs. 1, 2, 3 and 5).

Water is supplied to the reservoir in the following manner. Formed in the central portion of the rear side member 3 is an opening 29 preferably semi-circular in shape. Extending inwardly and downwardly from this opening 29 is a curved shield 30 which covers and protects from the earth above, an opening 31 provided in the cover 23. Accordingly, when water is poured into the opening 29 by a sprinkling can, hose or other means, it will pass through the opening 31 into the reservoir until the latter is filled, the hole 31 being fully protected from the earth above by the shield 30. (See Figs. 1, 2, 4 and 7).

It will now be seen that my improved window and veranda box offers many advantages. In the first place, the frame and reservoir being constructed in sections, the box may be lengthened or contracted to fit a particular space without the necessity of making the box to order. The flattened tubes 25 filled with moss, make it possible for the earth contained within the box to be automatically and properly watered. And furthermore, water may be supplied to the reservoir without removing the cover, the openings 29 and 31 being provided for that purpose.

I do not wish to be limited to the details of construction and arrangement herein shown and described, and any changes or modifications may be made therein within the scope of the subjoined claims.

Having described my invention, I claim:

1. A window and veranda box for plants, comprising a plurality of sections, a sectional reservoir adapted to be placed therein, means secured within said sections for removably supporting said reservoir, and a sectional cover for said reservoir, disposed below the tops of said sections, substantially as described.

2. A window and veranda box for plants, comprising a frame, a reservoir adapted to be placed therein, means secured within said frame for removably supporting said reservoir, a cover for said reservoir, disposed below the top of said frame, and capillary liquid-conducting means extending downwardly through said cover into the reservoir, substantially as described.

3. A window and veranda box for plants, comprising an oblong frame, a reservoir adapted to be placed therein, means secured within said frame for removably supporting said reservoir, a cover for said reservoir disposed below the top of said frame, means for conducting a liquid from the reservoir upwardly through said cover, said frame provided on one side with a liquid receiving opening, a shield extending from said opening to the cover, and over an aperture in the latter to admit water to the reservoir, substantially as described.

4. A window and veranda box for plants, comprising a plurality of sections, a sectional reservoir adapted to be placed therein, means secured within said sections for removably supporting said reservoir, a sectional cover for said reservoir disposed below the tops of said sections, and liquid-conducting tubes containing a porous substance, secured to said cover and projecting downwardly therethrough into the reservoir, substantially as described.

5. A window and veranda box for plants, comprising two end sections and an oblong middle removable section, L-shaped tongues formed on those ends of the middle section which engage the corresponding ends of the end sections, devices adapted to pass through the last named ends and the L-shaped tongues to removably secure said middle section to the end sections, a similarly formed sectional reservoir adapted to be placed within said frame, ledges formed on the interior of the latter to support said reservoir, and a sectional cover for said reservoir disposed below the top of said frame, substantially as described.

6. A window and veranda box for plants, comprising two end sections and an oblong middle removable section, L-shaped tongues on those ends of said middle section which engage the corresponding ends of the end sections, bolts adapted to pass through the last named ends and the L-shaped tongues to removably secure said middle section to the end sections, a similarly formed sectional reservoir adapted to be placed within said frame, ledges formed on the inside of the latter to support said reservoir, a sectional cover for said reservoir disposed below the top of said frame, and a plurality
5 of flattened liquid-conducting tubes filled with porous material, extending downwardly from and through said cover into the reservoir, substantially as described.

In testimony whereof I have hereunto set my hand this 1st day of March, 1915.

ALBERT J. MARTIN.

Witnesses:
WALTER V. SNYDER,
HOWARD S. SMITH.

Copies of this patent may be obtained for five cents each, by addressing the "Commissioner of Patents, Washington, D. C."